(No Model.) 4 Sheets—Sheet 3.
J. N. WILLIAMS.
TYPE WRITING MACHINE.
No. 588,522. Patented Aug. 17, 1897.
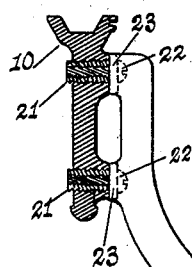
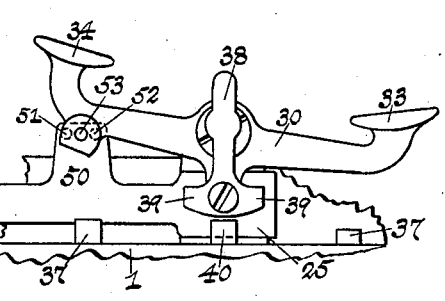
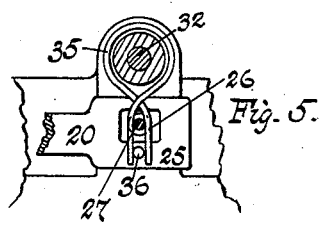
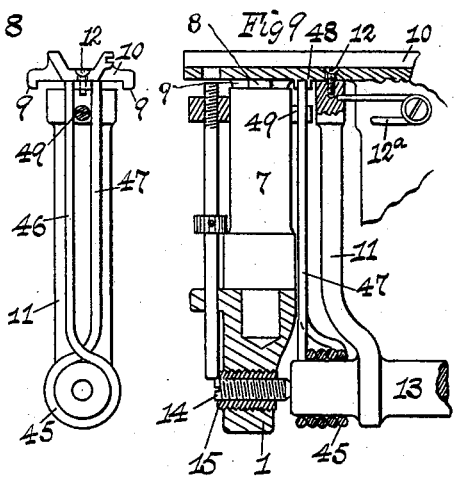
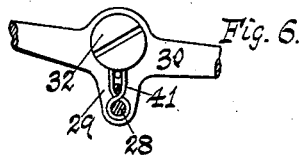
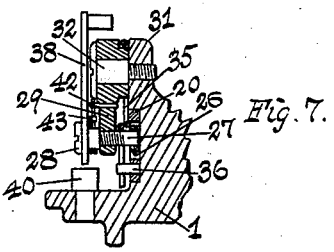
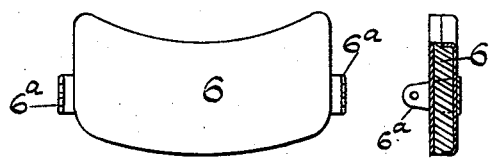
Witnesses
Wm E. Knight
M. V. Bidgood
Inventor
John N Williams
by
Knight & Bros
Attorneys (No Model.)  4 Sheets—Sheet 4.
J. N. WILLIAMS.
TYPE WRITING MACHINE.
No. 588,522.  Patented Aug. 17, 1897.
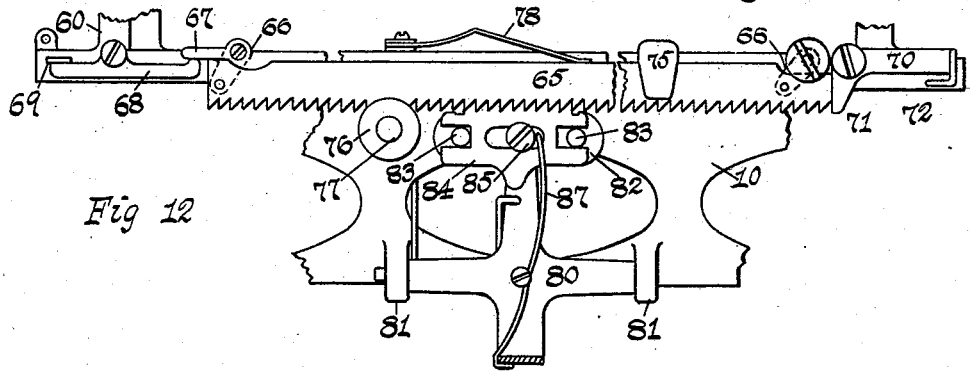
Fig 12
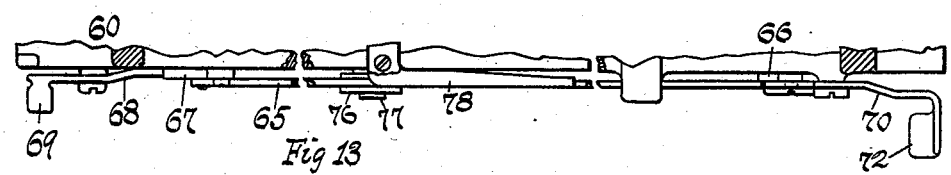
Fig 13
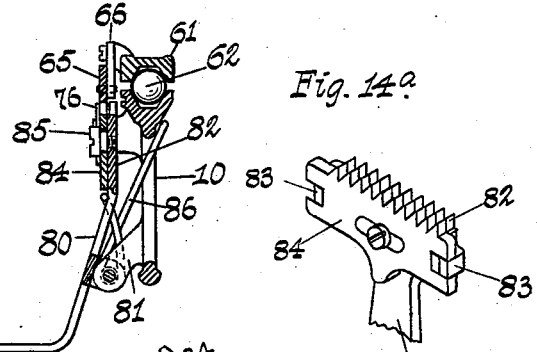
Fig 14  Fig. 14ª
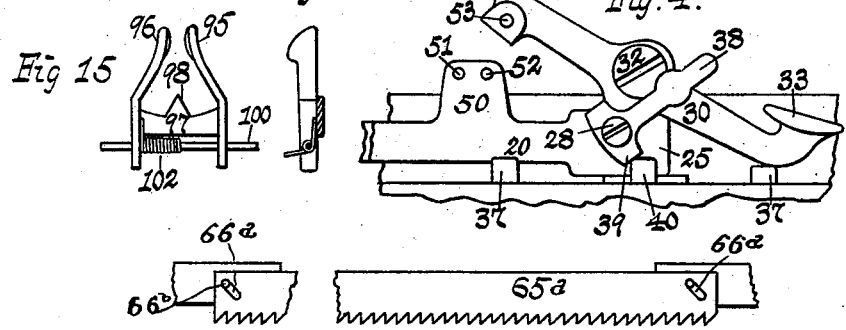
Fig 15  Fig 16  Fig. 4.
Fig 17
Witnesses  Inventor

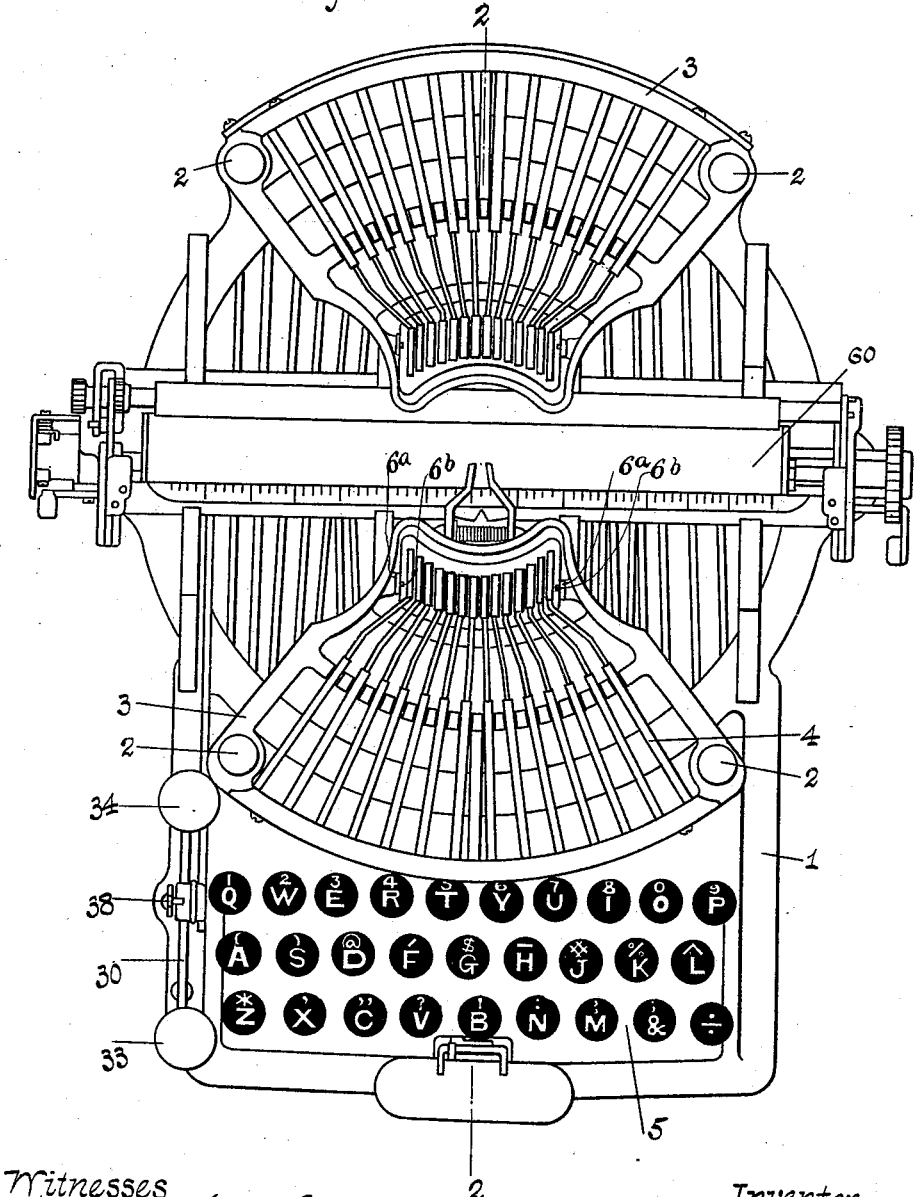

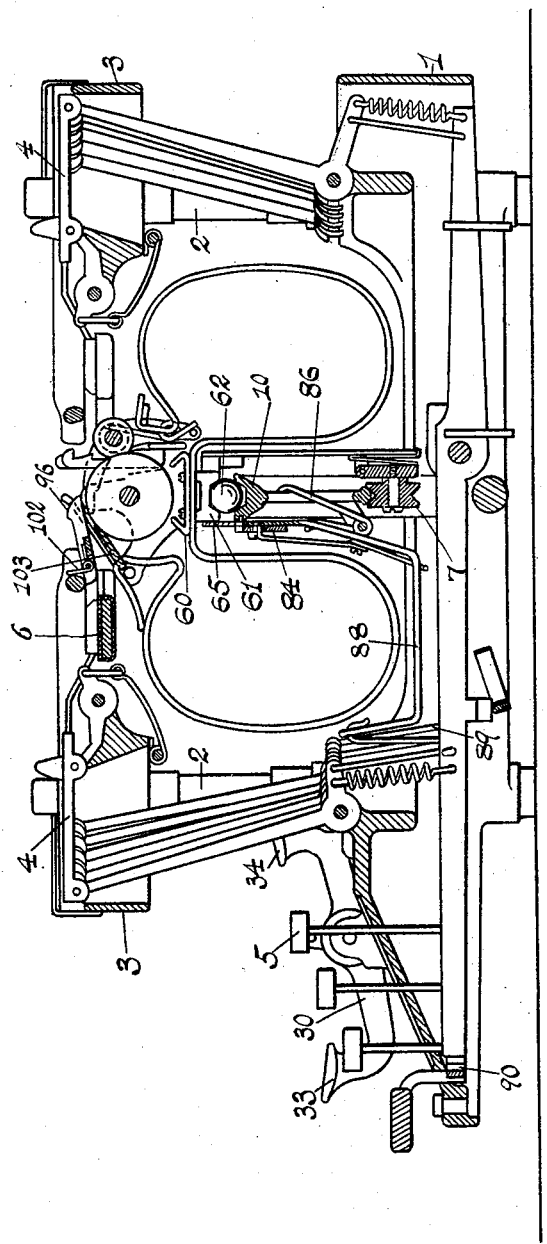

UNITED STATES PATENT OFFICE.

JOHN N. WILLIAMS, OF DERBY, CONNECTICUT.

TYPE-WRITING MACHINE.

SPECIFICATION forming part of Letters Patent No. 588,522, dated August 17, 1897.

Application filed January 11, 1896. Serial No. 575,065. (No model.) Patented in England September 29, 1891, No. 16,488; in Belgium August 18, 1892, No. 100,992; in France August 18, 1892, No. 223,751, and in Germany August 28, 1892, No. 82,342.

*To all whom it may concern:*

Be it known that I, JOHN N. WILLIAMS, a citizen of the United States, residing at Derby, in the county of New Haven and State of Connecticut, have invented certain new and useful Improvements in Type-Writing Machines, (for which I have obtained patents in England, No. 16,488, dated September 29, 1891; in Belgium, No. 100,992, dated August 18, 1892; in France, No. 223,751, dated August 18, 1892, and in Germany, No. 82,342, dated August 28, 1892,) of which the following is a specification.

The general character of the machine to which my improvements are applied has been shown and described in numerous prior patents granted to me, said machine comprising, essentially, a paper-carriage adapted to be moved both forward and backward from a normally central position, so as to receive impressions from any one of three type mounted upon each type-bar. The type-bars have the grasshopper movement and are mounted in two sets or series upon stationary frames arranged in front and rear of the movable paper-carriage.

My present invention relates to improvements in the carriage centering and shifting devices, the ratchet-feed, the ink-pads, and the combined guide and index.

In order that my invention may be fully understood, I will first describe the same with reference to the accompanying drawings and afterward point out the novelty with more particularity in the annexed claims.

In said drawings, Figure 1 is a general plan view of a type-writer embodying my invention. Fig. 2 is a vertical longitudinal sectional elevation of the same, taken on the line 2 2 of Fig. 1. Fig. 3 is an enlarged detail elevation showing the improved carriage-shifting device with the automatic centering-lock. Fig. 4 is a similar detail view showing the parts shifted. Figs. 5, 6, and 7 are enlarged detail views of parts of said shifting device. Fig. 8 is an enlarged detail inside elevation of the main carriage - centering spring. Fig. 9 is an enlarged detail sectional elevation of a portion of the carriage and supporting device, showing the centering spring and lock. Fig. 10 is a detail plan of the inking-pad. Fig. 11 is a transverse sectional view of the same. Fig. 12 is an inside elevation showing the rack-bar and ratchet-feed of the paper-carriage. Fig. 13 is a plan of the same. Fig. 14 is a detail sectional view of the same. Fig. 14$^a$ is a perspective detail view of a slightly-modified form of ratchet. Figs. 15 and 16 are detail views of the combined type-bar guide and index. Fig. 17 is a detail view of a modified form of rack-bar.

The main stationary base-frame 1 has extended up from it posts 2, which support the auxiliary frames 3 in which the type-bars 4 are pivoted. Each type-bar is provided with three characters which are adapted to make an impression upon the platen in each of the three positions of the paper-carriage. The bank of keys 5 are connected with the type-bars in any preferred manner.

6 are the ink-pads, formed with the perforated spring-ears 6$^a$, which engage the lugs or pins 6$^b$, projecting inwardly in the auxiliary frames 3 for supporting the pads in contact with the type-blocks. (See Fig. 1.) By reason of the spring-ears the pads can be readily sprung into and out of position.

7 are posts extending up from the base-frame 1. One of the posts 7 is provided at top with a small stud 8, which engages the downwardly-projecting flanges 9 of the girder track-frame 10 for confining the latter in its movements forward and back. The girder track-frame is supported upon the upper ends of rock-arms 11 and movably attached by means of pins or screws 12, (formed with hemispherical heads,) which pass through countersunk openings in the track and are screwed into or otherwise secured to the rock-arms. The portions of openings in track 10 through which the shanks of screws 12 pass are sufficiently large to allow for a slight movement of the track upon the ends of the rock-arms 11, permitted by the rounded or hemispherical heads, a spring 12$^a$ being provided at each end of the girder track-frame to compensate for the loose joint, one end of such spring engaging the track-frame and the other end the rock-arm. The rock-arms 11 are formed integral with or otherwise secured to the rock-shaft 13, which is pivotally mounted at its ends upon the pointed journal-screws 14, which work in screw-threaded bushings 15, adjustably seated in threaded openings in the main base-frame 1.

It will be observed that by reason of the connection between the girder track-frame and rock-arms 11 through pins or screws 12, enlarged openings in track 10, and yielding springs 12ª said track will be allowed to move back and forth over the center in a practically horizontal plane by reason of the shifting connections now to be described.

20 is the horizontally-sliding shifting-bar, secured to the under girder-frame of track 10 by means of the adjustable screw-threaded bushings 21, threaded into the girder-frame, and screws 22, which pass through suitable openings in the ears or lugs 23 of the bar 20 and engage in the threaded openings of bushings 21. By reason of the threaded bushings 21, which have screw-nicks by which they can be independently adjusted in the girder-frame, the shifting-bar 20 can be readily secured to the girder-frame of track 10, and at the same time the vertical plane of the girder track-frame can be adjusted to insure the horizontal position of the track. The adjustable bushings 21 are also very important in affording a ready means for accurately adjusting the longitudinal position of the shifting-bar with relation to the shifting-lever, so as to insure the proper engagement and working of the lugs of the automatic locking device. The adjustment can be regulated to a nicety by this means and is very important in producing the best results with the machine. The shifting-bar 20 extends toward the front of the machine and at its forward end is provided with a guide portion 25, resting on a suitable flange or projection extending up from the base-frame.

26 is a square slot formed in the end of bar 20, in which engages a small roller 27, journaled upon a pin 28, which passes through the downwardly-projecting arm 29 of the compound lever 30. The lever 30 is pivoted to the lug 31 of the base-frame 1 upon a pivot-screw 32 and is formed with the keys 33 and 34, by which it can be tilted forward or backward to shift the carriage back and forth past its normal central position. As the shifting-bar 20 moves back and forth between the guides there is no tendency for the girder track-frame to move out of the horizontal, the screws 12, openings in track 10, and springs 12ª allowing for the levers 11 to rock beneath the track.

35 is a spring surrounding the circular boss of the tilting key-lever 30, and having its downwardly-projecting legs passing on opposite sides of the pin 28 to assist in returning the tilting lever and shifting-bar 20 to central position after the carriage has been shifted.

36 is a pin on bar 20, which engages the ends of spring 35 for holding it in position to exert its pressure upon pin 28.

37 are stops adapted to limit the downward movement of the ends of the tilting lever 30.

38 is a locking-lever pivoted to arm 29, upon the outer end of screw 28, and formed with two cam locking ends 39, which are adapted to engage with the central stop 40 and lock the tilting lever 30 in either of its extreme positions for holding the carriage in shifted forward or backward position when it is desired to print in capitals or produce a series of numbers or other characters. The lever 38 has a small centering-spring 41, which is mounted on pin 28 and confined by the pin 42, projecting from arm 29, and engages lug 43, so as to operate in the same manner as spring 35.

45 is the main centering-spring, coiled around the end of rock-shaft 13 and having its opposite ends or legs 46 and 47 extending up to a point beneath the track 10 where they engage opposite sides of a central lug 48, projecting beneath the track. A lug 49 extends inwardly from one of the posts 7 to keep the spring 45 in position and enable it to act upon the lug of the track-frame for returning and normally holding the track-rail and other parts in central position.

The bar 20 has an upwardly-projecting shoulder 50, carrying two pins 51 and 52, and the rearwardly-projecting end of shifting key-lever 30 carries a pin 53, which in the normal position of the machine rests between the pins 51 and 52 and locks the bar 20 and track-frame which supports the carriage in central position and holds them against vibration. The pins 51, 52, and 53 do not, however, interfere with the free movement of the lever 30.

60 is the carriage, formed with an under track 61, corresponding to track 10, and 62 are ball-bearings between the tracks 10 and 61 for supporting the carriage 60 and allowing it to move easily transversely of the machine. The carriage 60 carries the paper-feeding mechanism, paper-guides, and platen, which will not be specifically described, as they may be of any preferred construction.

65 is the feed rack-bar, pivotally mounted upon the ends of small links 66, which are pivoted to the carriage-frame in inclined position, so that in pushing the paper-carriage to the right the rack-bar 65 will rise over the ratchet, which will be presently described. At the left-hand side of the carriage the link 66 is formed with an arm 67, with which engages a small pivoted lever 68, pivoted to the carriage and formed with an operating-finger 69. By pressing the finger 69 the link 66 can be moved on its pivot to cause the rack-bar to rise and disengage the ratchet. At the right-hand side of the carriage is provided a pivoted lever 70, having a foot 71, which rests against the end of the rack-bar 65, and an operating-finger 72. By pressing the finger 72 the rack-bar 65 is pushed to the left, and by reason of its pivoted supporting-links 66 it will rise and disengage the ratchet. The rack-bar 65 is confined between the downwardly-projecting cast lugs 75, preferably formed integral with the carriage-frame, and also by means of a grooved roller or head 76, journaled upon or formed integral with the outer end of the pin 77. The grooved head 76 engages the rack-bar 65 preferably at a point close to the ratchet in order to closely confine the rack-bar against lateral movement and insure the perfect operation of the ratchet.

78 is a leaf-spring secured to carriage 60 and engaging rack-bar 65 for holding it in normal position.

In Fig. 17 I have shown a modification of the rack-bar. In this form the rack-bar 65ᵃ is formed with inclined slots 66ᵃ, in which engage the pins 66ᵇ for supporting the bar and allowing it to rise over the ratchet, as in the preferred form.

The ratchet I prefer to employ is fully shown in Figs. 12, 14, and 14ᵃ. It consists of a frame 80, pivoted between lugs 81 and formed with an integral short rack-bar 82 and forwardly-projecting lugs 83, upon which slides a second short rack-bar 84.

85 is a screw engaging a central slot in the rack-bar 84 to assist in confining it against the rack-bar 82.

86 is the mainspring, engaging the girder track-frame 10 and the frame 80 for holding said frame in normal position.

87 is another spring engaging the frame 80 and the small sliding rack-bar 84.

88 is an arm which is suitably connected through link 89 with the feed-bar 90. It will be observed that when the feed-bar 90 is depressed the frame 80 will move on its pivot and cause the rack-bar 82 to engage the main rack-bar 65, and as soon as this occurs the small sliding rack-bar 84 will be moved longitudinally one step by reason of the spring 87. As soon as the pressure is removed from bar 90 the spring 86 will return the frame 80 to normal position, which will throw the main rack-bar 65 into engagement with the small spring sliding rack-bar 84, and as the main feed-spring of the carriage is much stronger than the small spring 87 said rack-bar will immediately move one step with the carriage and the main rack-bar, affording the proper space for the next impression of a letter or character.

In Fig. 14ᵃ the lugs 83 are formed integral with the rack 82 by simply cutting the rack with square tongues at its ends and bending them forwardly into position.

In Figs. 15 and 16 I have shown my improved type bar or block guide, which consists of two fingers 95 and 96, between which the type-block passes when making an impression to insure its striking the right point on the paper. Fingers 95 and 96 are connected by an integral cross-bar 97, having a pointer or index 98, which indicates the central position on the machine at which all of the type should strike, and is also used when it is desired to bring any particular number on the carriage-scale in position for a particular letter. The combined guide and index is pivoted between lugs 98 and 99 on the pin 100 and is provided with a small spiral spring 102 for holding it in normal position, at the same time allowing it to rise with the pivoted spring-pressed scale-bar 103 for inserting paper.

Certain features of the carriage-feeding mechanism, the paper-feeding devices, the means for attaching the shifting-bar to the track-frame, the track-frame to the rock-arms, and the carriage to the track-frame, and the locking-bolts illustrated and described in this application, but not herein claimed, are claimed, so far as novel, in my copending application filed of even date herewith, Serial No. 575,066.

Having thus described my invention, what I claim, and desire to secure by Letters Patent, is—

1. In a type-writing machine, the combination of a carriage adapted to be shifted into three positions, spring mechanism for returning and holding the carriage normally in central position, a longitudinally-movable shifting-bar connected with the carriage, a double shifting-lever formed with an arm which engages directly with and is adapted to operate the shifting-bar, and stops with which said lever engages for limiting its movement in both directions, as set forth.

2. In a type-writing machine, the combination of a shiftable carriage-track mounted upon suitable supports, a traveling carriage mounted thereon, a centering-lug on the shiftable track, a spring 45 having legs 46 and 47 engaging opposite sides of the centering-lug, and a second lug on a stationary part of the machine-frame also engaging the legs of the spring, substantially as set forth.

3. In a type-writing machine, the combination of the frame, rock-arms journaled therein, the shiftable track mounted on the rock-arms, posts 7 extending up from the frame, a lug 8 on one of the posts, flanges 9 on the track adapted to engage the lug on said post, a centering-spring for the track, a carriage mounted on the track, and means for shifting the track back and forth, substantially as set forth.

JOHN N. WILLIAMS.

Witnesses:
WM. E. KNIGHT,
M. V. BIDGOOD.